US00RE37043E

(19) United States
(12) Reissued Patent
Yamazaki

(10) Patent Number: US RE37,043 E
(45) Date of Reissued Patent: Feb. 6, 2001

(54) LAYABLE SEAT

(75) Inventor: Ryokichi Yamazaki, Tokyo (JP)

(73) Assignee: Kotobuki Corporation (JP)

(21) Appl. No.: 08/678,132

(22) Filed: Jul. 11, 1996

Related U.S. Patent Documents

Reissue of:
(64) Patent No.: 5,328,238
Issued: Jul. 12, 1994
Appl. No.: 07/967,098
Filed: Oct. 27, 1992

(30) Foreign Application Priority Data

Oct. 31, 1991 (JP) ..... 3-089809

(51) Int. Cl.[7] ..... A47C 1/12
(52) U.S. Cl. ..... 297/332; 297/378.1; 52/9
(58) Field of Search ..... 297/15, 16, 316, 297/323, 332, 337, 340, 378.1, 378.12, 378.13, 16.1, 334, 333; 52/8, 9

(56) References Cited

U.S. PATENT DOCUMENTS 2,164,116 * 6/1939 Lincoln .
2,582,600 * 1/1952 Nordmark .
3,025,106 * 3/1962 Evans et al. .
3,156,501 * 11/1964 Harris .
4,000,586 * 1/1977 Vance et al. .
4,063,392 * 12/1977 Vay Ryn et al. .
4,155,202 * 5/1979 Hartman .
4,294,048 * 10/1981 Sutter .
4,557,080 * 12/1985 Walworth et al. ..... 52/9
5,328,238 * 7/1994 Yamazaki ..... 297/332

FOREIGN PATENT DOCUMENTS 62-101211 * 5/1987 (JP) .
07301015 11/1995 (JP) .
80/00358 * 3/1980 (WO) .

* cited by examiner

*Primary Examiner*—Milton Nelson, Jr.
(74) *Attorney, Agent, or Firm*—Fulbright & Jaworski LLP

(57) ABSTRACT

A layable seat includes front and rear paired supporting legs which are layably raised on a floor at two positions separated from each other in a back-and-forth direction, a seat member pivotably connected to the front paired legs, paired link levers each of which has one end pivotably connected to the corresponding one pivotal center of the seat member and the other end pivotably connected to the corresponding rear leg. The seat member is elastically held at its half-folded position by torsion coil springs, and has paired engaging pins which project sideward therefrom and engage the lower edges of the link levers to hold the seat member at its horizontal position against a user's weight.

26 Claims, 4 Drawing Sheets

LAYABLE SEAT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a seat and, more particularly, to a layable seat which is entirely pivotal between a horizontally laid non-use position where the seat is laid horizontally along a floor surface, and a raised use position where the seat is raised from the floor.

2. Description of the Related Art

The layable seat described above is known from, e.g., Published Unexamined Japanese Patent Application No. 62-101211. Such a seat is set on the upper surface of each of a plurality of nestable decks, which are movably installed on the floor surface of, e.g., a gymnasium, a community center, or a multi-purpose hall, and have sequentially different heights. And, these seats are used to temporarily set seats or increase the number of seats.

Each of the plurality of decks has a plurality of wheels at its lower end portion so that the deck is movable on the floor surface of the building as described above. The plurality of decks are mounted on the wall surface of such a building or in a recess formed in the wall surface so as to be expandable and contractable thereto.

When the plurality of decks are pulled out from the wall surface of the building or the recess of the wall surface, the plurality of decks constitute a staircase having deep steps on the floor surface of the building.

When the plurality of decks are contracted on the wall surface of the building or in the recess of the wall surface, the decks lower than the highest deck are sequentially nested in the inner space of the highest deck, thus decreasing the area of the floor of the building which is occupied by the decks.

A large number of layable seats are installed side by side on the upper surface of each of the plurality of decks. When the layable seats are set at a horizontally laid non-use position where they are laid horizontally along the upper surface, the plurality of decks can be contracted to the wall surface of the building or the recess of the wall surface. When the plurality of decks are pulled out from the wall surface of the building or the recess of the wall surface and then the seats on the decks are pivoted to a raised use position where they are raised from the upper surfaces of the decks, the layable seats can be used as temporary seats.

In the conventional layable seat, a pair of supporting legs that support the right and left side edges of a backrest are installed at their base end portions on the upper surface of a corresponding deck, so that the supporting legs are manually selectively pivotal or automatically selectively pivotal by a motor between a horizontally laid position where the supporting legs are laid horizontally along the upper surface, and a raised position where the supporting legs are raised from the floor surface. A seat member is pivotably connected at the rear end portions of its right and left side surfaces to the paired supporting legs, so that the seat member is pivotable between a horizontal use position where the seat member is horizontal, and a vertically folded position where the seat member is flipped up in a substantially vertical direction to extend along the pair of supporting legs, while the paired supporting legs are arranged at the raised position. The seat member is urged to the vertically folded position by urging means incorporated in the paired supporting legs.

When a user sits down on the seat member, the user at first must pivot the seat member from the vertically folded position to the horizontal use position against the urging force of the urging means, and then manually hold the seat member at the horizontal use position until he or she places his or her buttocks on the seat member. Therefore, if the user carries baggage with his or her two hands, if the user's two hands are disabled, or if the user's one hand is disabled and he or her carries baggage with his or her other hand, the user needs other's help or the user must temporarily put the baggage held by his or her two hands or one hand on the floor in order to sit down on the seat member.

In order to pivot the seat member from the vertically folded position to the horizontal use position without using the hand, it is proposed that the seat member is inclined forwardly with it front end separating from the backrest when the seat member is located at the vertically folded position. In this state, if the user puts his or her buttocks on the front end of the seat member which is inclined forwardly and then sits down, the user can pivot the seat member to the horizontal use position with his or her buttocks.

In this case, however, when the layable seat is entirely laid on the upper surface of the corresponding deck, the front end of the seat member which is inclined forwardly at the vertically folded position firstly contacts the upper surface of the deck. The front end of the seat member slides on the upper surface until the seat member is laid horizontally on the upper surface together with the paired supporting legs and the backrest. For this reason, every time the front end of the seat member abuts against the upper surface of the corresponding deck, comparatively large noise is produced. The front end of the seat member, and a portion of the upper surface against and on which the front end of the seat member constantly abuts and slides can be easily damaged. Furthermore, since the front end of the seat member is soiled by this slidable contact, it soils the clothing of the user who contacts it.

SUMMARY OF THE INVENTION

The present invention has been derived from the above situation, and its object is to provide a layable seat which can hold a seat member at a half-folded position between a horizontal use position and a vertically folded position before a user sits down while the layable seat is set at a raised use position, so that the user can move the seat member to the horizontal use position with his or her buttocks without using his or her hand, and which can make the entire portion of the seat member reach at a horizontally laid non-use position of the layable seat at once when the layable seat is pivoted from the raised use position to the horizontally laid non-use position, thereby preventing damage to a part of the seat member and to a portion of a floor surface corresponding to the part of the seat member, and soiling of the clothes of the user which touch the seat member.

The above described object of the present invention can be achieved by a layable seat comprising: supporting leg means which is adapted to be mounted on a floor surface to be pivotable between a raised position where the leg means is raised from the floor surface and a horizontally laid position where the leg means is horizontally laid along the floor surface; a seat member which is mounted on the supporting leg means to be pivotable between a horizontal position where the seat member extends substantially horizontally from the supporting leg means located at the raised position and a folded position where the seat member is raised substantially vertically to extend along the supporting leg means located at the raised position; urging means which is mounted on the supporting leg means and urges the seat member to a half-folded position between the horizontal and folded positions; and forcible moving means which is mounted on the supporting leg means and forcibly moves the seat member from the half-folded position to the folded position against an urging force of the urging means in response to the pivotal movement of the supporting leg means from the raised position to the horizontally laid position.

In the layable seat characterized by being constructed as described above, the seat member is held at the half-folded position by the urging means while the supporting leg means is set at the raised position. Hence, the user can move the seat member from the half-folded position to the horizontal use position with his or her buttocks without using the hand.

When the supporting leg means is pivoted from the raised position to the horizontally laid position in order to pivot the layable seat from a raised use position to a horizontally laid non-use position, the forcible moving means forcibly moves the seat member to the folded position against the urging force of the urging means in response to the pivotal movement of the supporting leg means from the raised position to the horizontally laid position. Hence, the entire portion of the seat member can reach the horizontally laid position at once, damage to a part of the seat member and to a portion of a floor surface corresponding to the part of the seat member can be prevented, and soiling of the clothes of the user which touch the seat member can be prevented.

In the layable seat according to the present invention and characterized by being constructed as described above, the supporting leg means can be pivotably mounted on an upper surface of a movable deck having a traveling means at its lower-end portion.

By preparing a plurality of nestable movable decks of this type having sequentially different heights, mounting a plurality of layable seats according to the present invention side by side on each of the movable decks, extending the plurality of movable decks in a telescopic manner, and locating the supporting leg means of the plurality of layable seats on the upper surfaces of the extended movable decks at the raised position, a large number of seats can be additionally, temporarily installed within a short period of time. When these seats are not used, the supporting leg means of the plurality of layable seats on the upper surfaces of the movable decks are pivoted to the horizontally laid position, and thereafter the plurality of movable decks are contracted to be nested, thereby minimizing the space required for housing the plurality of movable decks.

In the layable seat according to the present invention and characterized by being constructed as described above, it is preferable that the supporting leg means includes a first supporting leg and a second supporting leg, an extending end of the second supporting leg being located backward from an extending end of the first supporting leg at their raised positions, the seat member has a rotational center shaft at its rear-end portion to make it pivotable in a vertical direction, and the forcible moving means includes a link lever which has one end portion coupled to the second supporting leg to be pivotable in the vertical direction and the other end portion coupled to the rotational center shaft of the rear end portion of the seat member to be pivotable in the vertical direction and an engaging pin projecting sideward from a position of the rear-end portion of the seat member located backward from the rotational center shaft of the rear-end portion of the seat member, and the link lever causes the engaging pin of the seat member to move toward the floor surface against the urging force of the urging means while the first and second supporting legs are pivoted from the raised positions to the horizontally laid positions, and sets the seat member at the folded position when the first and second supporting legs reach the horizontally laid positions, so that the seat member is horizontally laid along the floor surface together with the first and second supporting legs at one time.

The supporting leg means, the seat member, and the forcible moving means having the above arrangements are compact in size and simple in structure.

In the layable seat having the supporting leg means, the seat member, and the forcible moving means arranged in the above manner, it is preferable that the engaging pin at the rear-end portion of the seat member is engaged with a portion of the first supporting leg when the seat member is located at its horizontal position, so that the seat member is inhibited to move downward from the horizontal position.

This arrangement simplifies a structure of means for prohibiting pivotal movement of the seat member downward from the horizontal position, and makes the entire structure of the layable seat compact.

In the layable seat having the supporting leg means, the seat member, and the forcible moving means arranged in the above manner, it is preferable that the urging means includes a torsion coil spring which has a central portion supported by the first supporting leg and two extending end portions clamping the engaging pin at the rear-end portion of the seat member.

The urging means having such an arrangement is simple in its structure and makes the entire structure of the layable seat compact.

The layable seat having the supporting leg means, the seat member, and the forcible moving means arranged in the above manner can further comprise a backrest supported by the second supporting leg.

In the layable seat having the supporting leg means, the seat member, and the forcible moving means arranged in the above manner, a rotational center of the second supporting leg with respect to the floor surface can be located backward from and above a rotational center of the first supporting leg with respect to the floor surface, and the layable seat can further comprise an armrest which is supported at its two positions, spaced apart from each other in a back-and-forth direction, to be vertically pivotable by the first and second supporting legs.

With this arrangement, the armrest is automatically pivoted between a horizontal position, where the arm rest is substantially horizontal, and a folded position, where the armrest is folded to extend along the first and second supporting leg means, in response to the pivot movement of the supporting leg means between the raised position and the horizontally laid position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A layable seat according to an embodiment of the present invention will be described in detail with reference to the accompanying drawings.

Figure 1:
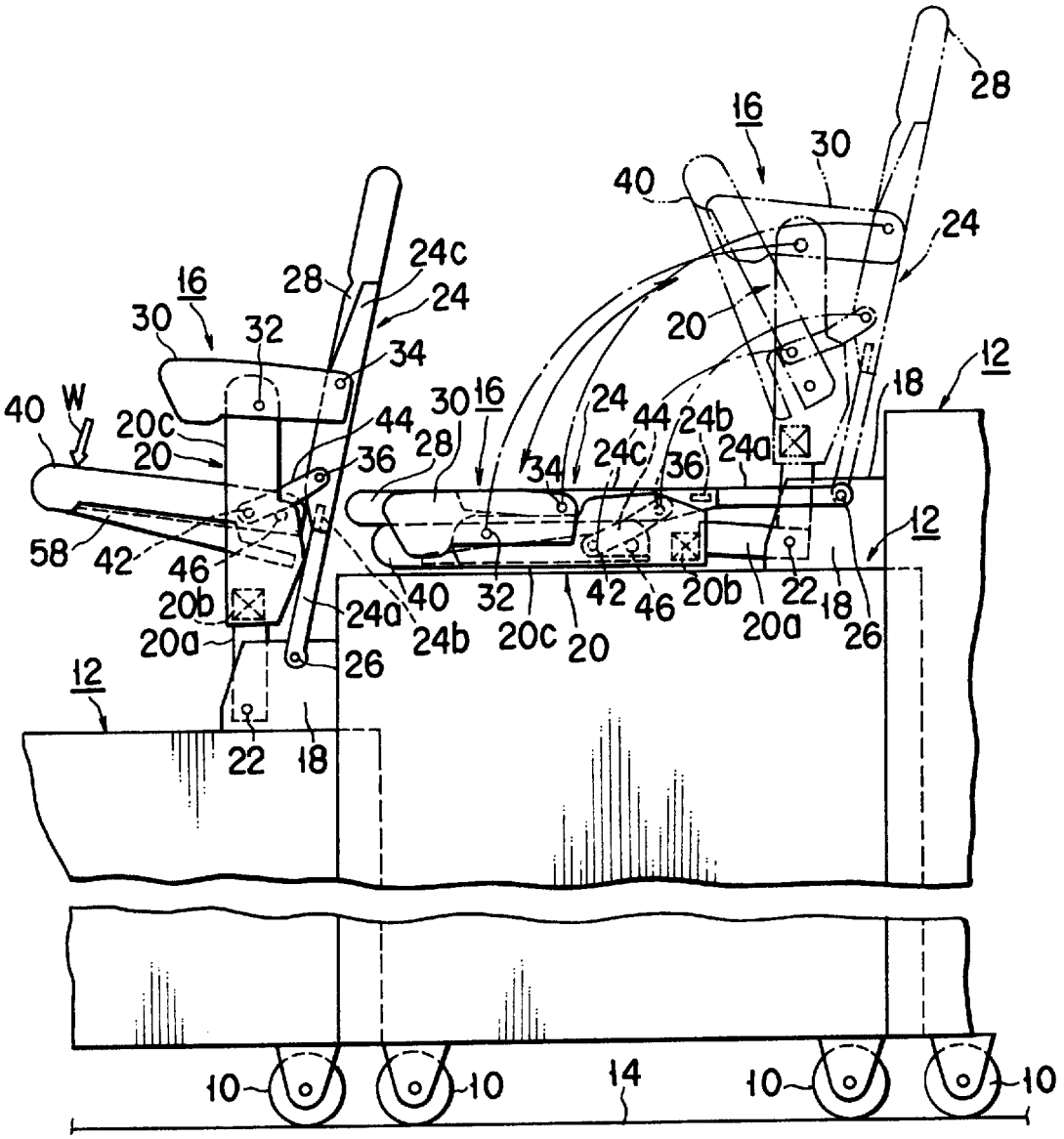
FIG. 1 is a side view schematically showing layable seats according to an embodiment of the present invention, which are installed on the upper surfaces of a plurality of nestable movable decks.

FIG. 1 shows a plurality of nestable movable decks 12. The movable decks 12 have sequentially different heights, and a plurality of wheels 10 serving as traveling means are provided at a lower end portion of each movable deck 12. The plurality of nestable movable decks 12 can be moved on a floor surface 14 of, e.g., a gymnasium, a community center, or a multi-purpose hall by the plurality of wheels 10 at their lower end portions.

The plurality of nestable movable decks 12 can extend telescopically on the floor surface 14 as shown in FIG. 1, and the decks lower than the highest deck are sequentially nested in the inner space of the highest deck. A gap having a predetermined height is defined between the top plates of the adjacent two nestable movable decks 12.

Figure 2:
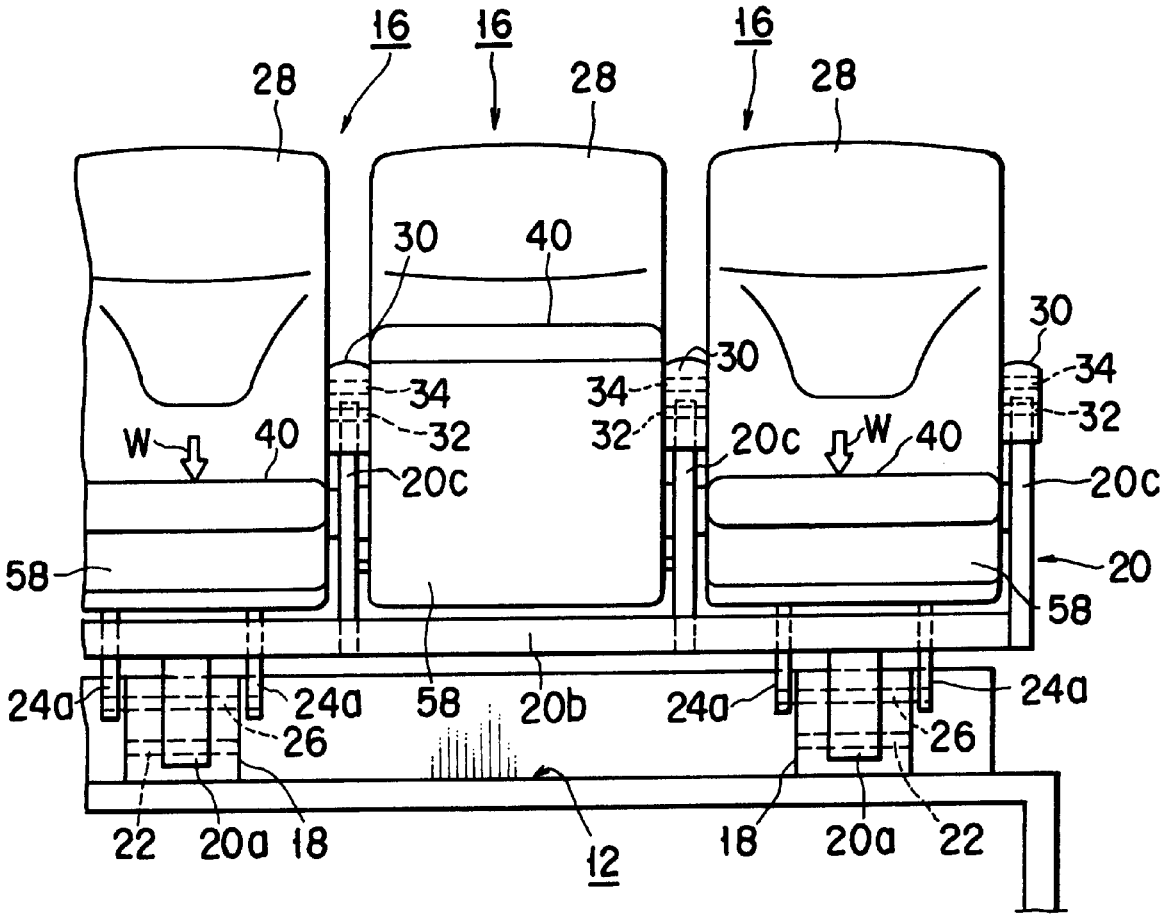
FIG. 2 is a front view schematically showing a state wherein a plurality of layable seats according to the embodiment of the present invention are installed on the upper surface of each of the movable decks.

A plurality of layable seats 16 according to the embodiment of the present invention are installed side by side on the upper surface of the top plate of each of the plurality of movable decks 12, as shown in FIG. 2.

The plurality of layable seats 16 have bases 18 fixed at a plurality of positions at the rear end portion of the upper surface of each top plate to be spaced apart from each other at a predetermined distance in the right-and-left direction. The height of each base 18 is smaller than the gap described above.

A plurality of leg members 20a of first supporting legs 20 are connected to the front-end portions of the bases 18 by rotational center shafts 22 so as to be vertically pivotal between a raised position, where the leg members 20a raise from the upper surface of the corresponding top plate, as shown in FIGS. 1 and 2, and a horizontally laid position, where the leg members 20a are laid horizontally along the upper surface of the corresponding top plate in front of the bases 18, as shown in FIG. 1.

Figure 3:
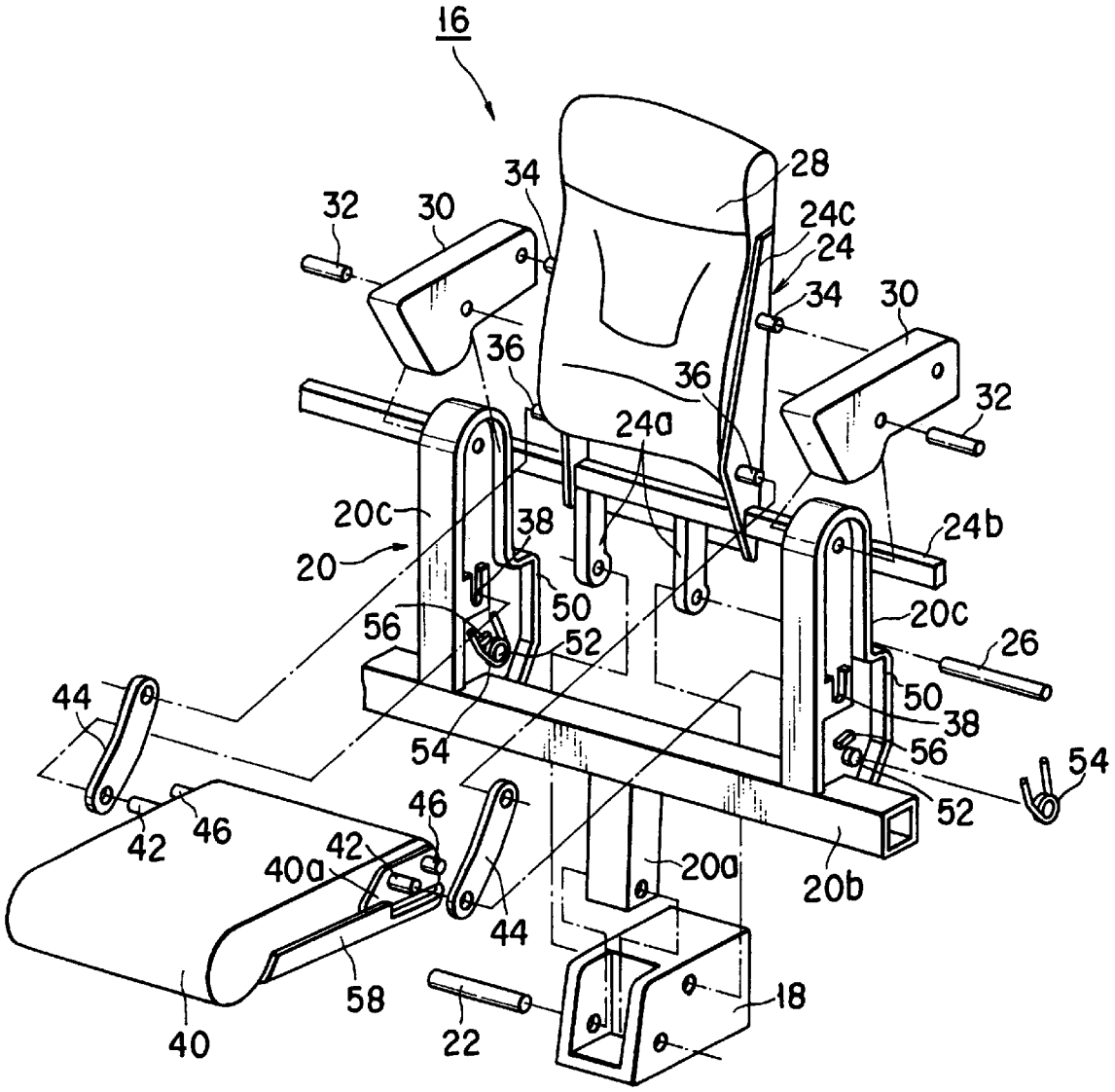
FIG. 3 is a schematic exploded perspective view of the layable seat shown in FIG. 1.

The extending end portions of the plurality of leg members 20a of the first supporting legs 20 are coupled to each other through a beam member 20b that extends horizontally in the right-and-left direction along the upper surface of the corresponding top plate, as shown in FIGS. 1, 2, and 3. The base-end portions of a plurality of seat member supporting columns 20c are fixed at the two ends of the beam member 20b and at a plurality of predetermined equidistant positions on the beam member 20b, and extend in the same direction as that of the plurality of leg member 20a.

A plurality of leg members 24a of second supporting legs 24 are connected to the rear-end portions of the bases 18 by rotational center shafts 26 so as to be vertically pivotal between a raised position, where the leg members 24a raise from the upper surface of the corresponding top plate, as shown in FIGS. 1 and 2, and a horizontally laid position, where the leg members 24a are laid horizontally along the upper surface of the corresponding top plate in front of the bases 18. The rotational center shafts 26 of the second supporting legs 24 are located above the rotational center shafts 22 of the first supporting legs 20, thus the second supporting legs 24 at the horizontally laid positions are laid on the corresponding first supporting legs 20 at the horizontally laid positions, as shown in FIG. 1.

The extending end portions of the plurality of leg members 24a of the second supporting legs 24 are coupled to each other through a beam member 24b that extends horizontally in the right-and-left direction along the upper surface of the corresponding top plate, as shown in FIGS. 1, 2, and 3. The base-end portions of a plurality of backrest holding baskets 24c are fixed at the two ends of the beam member 24b and at a plurality of predetermined equidistant positions on the beam member 24b, and extend in the same direction as that of the plurality of leg members 24a.

Each of the plurality of backrest holding baskets 24c is arranged between the two adjacent seat member supporting columns 20c of the first supporting legs 20. Each backrest holding basket 24c holds a backrest 28.

An armrest 30 having a substantially inverted U-shaped cross-section is arranged on the upper-end portion of each first supporting leg 20, and the hollow portion of the longitudinally intermediate region of the armrest 30 is fitted on the upper-end portion of the first supporting leg 20. The longitudinally intermediate region of the armrest 30 is vertically pivotably supported on the upper end portion of the corresponding first supporting leg 20 by a rotational center shaft 32. The longitudinally rear-end portion of the armrest 30 is vertically pivotably supported on a rotational center shaft 34 fixed on the corresponding side surface of the corresponding backrest holding basket 24c.

Rotational center shafts 36 are also fixed to the two side surfaces of each backrest holding basket 24c at positions slightly above the beam member 24b.

A rotational center groove or hole 38 is formed in each of the two side surfaces of the paired seat member supporting columns 20c corresponding to the two side surfaces of the backrest holding basket 24c, and is located at a position below the lower rotational center shaft 36 of each side surface of the backrest holding basket 24c.

A rotational center shaft 42 projecting sideward from each of the two side surfaces of a seat member back plate 40a fixed to the lower-end portion of the lower surface of a seat member 40 is pivotably supported in the corresponding rotational center groove or hole 38.

Front- and rear-end portions of a link lever 44 are vertically pivotably coupled to the rotational center shaft 42 of the corresponding side surface of the seat member back plate 40a and the lower rotational center shaft 36 of the corresponding side surface of the backrest holding basket 24c, respectively.

Figure 4:
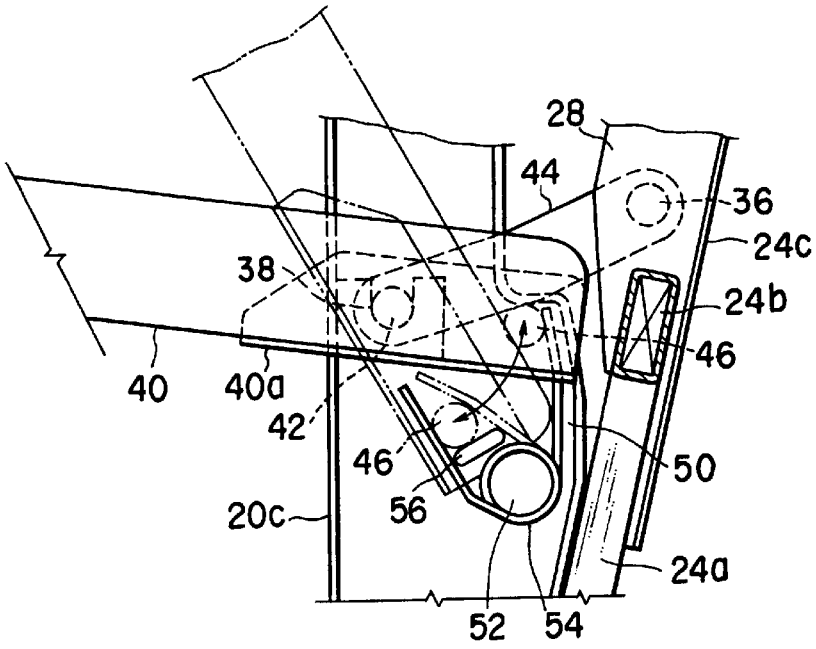
FIG. 4 is an enlarged side view schematically showing a torsion coil spring functioning as an urging means for urging a seat member to its half-folded position while the layable seat is located at the raised use position, a link lever and an engaging pin of the seat member, both of which function as forcible moving means for forcibly pivoting the seat member from the half-folded position to a vertically folded position against the urging force of the torsion coil spring in response to pivotal movements of first and second supporting legs from their raised positions to their horizontally folded positions while the layable seat is pivoted from the raised use position to its horizontally laid non-use position, and the seat member and the first and second supporting legs being coupled to each other through the link lever.
Figure 5:
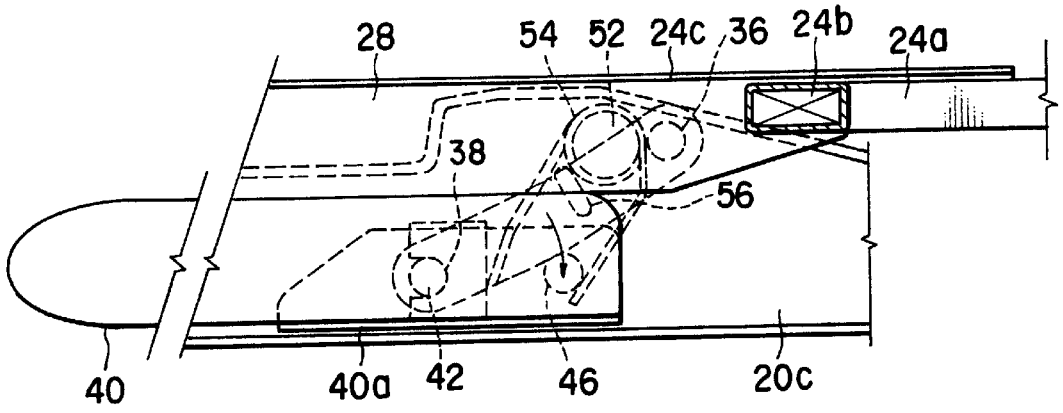
FIG. 5 is an enlarged side view schematically showing a state of the various members of FIG. 4 when the layable seat of FIG. 1 is set at the horizontally laid non-use position.

Engaging pins 46 project sideward from two side surfaces of the seat member back plate 40a at positions located backward from the rotational center shafts 42, and rearward projecting steps 50 are formed in the side surfaces of the paired seat member supporting columns 20c at positions located rearward from the corresponding rotational center grooves or holes 38. When the corresponding paired first supporting legs 20 are set at the raised position and the seat member 40 is set at the substantially horizontal position at the paired rotational center grooves or holes 38 of the seat member supporting columns 20c of the corresponding paired first supporting legs 20, the paired engaging pins 46 abut against upper-end portions of inner surfaces of the rear steps 50, as shown in FIG. 4. Thus, the rotation of the seat member 40 about the rotational center shafts 42 is prevented, so that the front-end portion of the seat member 40 can not be moved downward from the horizontal position. At this time, the engaging pins 46 of the seat member 40 also abut against the lower edges of the corresponding link levers 44, as shown in FIG. 4.

An urging means positioning boss 52 is formed in each side surface of the paired seat member supporting columns 20c corresponding to the two side surfaces of the backrest holding basket 24c at a position lower than the corresponding rotational center groove or hole 38. The central hole of a torsion coil spring 54 is fitted on each urging means positioning boss 52.

The two extending arm ends of the torsion coil spring 54 extend obliquely upward from the urging means positioning boss 52, and the two extending arm ends clamp an urging means function regulating projection 56 which is formed on each side surface of the paired seat member supporting columns 20c at a position spaced apart obliquely upward from the corresponding urging means positioning boss 52.

Each engaging pin 46 of the seat member 40 is also clamped by the two extending arm ends of the corresponding torsion coil spring 54.

Accordingly, when the first supporting legs 20, together with the second supporting legs 24 that are coupled to the first supporting legs 20 by the armrests 30, are set at the raised position where they are substantially vertically raised up from the upper surface of the top plate of the corresponding movable deck 12, the seat member 40 is pivoted around the seat member rotational center shafts 42 in the paired rotational center grooves or holes 38 of the corresponding paired seat member supporting columns 20c of the first supporting legs 20 by the urging force of the urging means applied to the corresponding engaging pins 46 by the two extending arm ends of the torsion coil springs 54, and is held at the half-folded position where the seat member 40 extends obliquely forward the paired seat member supporting columns 20c.

The seat member 40 at the half-folded position is indicated by a two-dot chain line in FIGS. 4 and 1, and is indicated by a solid line in the central layable seat 16 of FIG. 2.

As is apparent from FIG. 1, while the first and second supporting legs 20 and 24 are set at the raised positions, the armrest 30 coupling them is set at the substantially horizontal position.

At least one of the first and second supporting legs 20 and 24 set at the raised positions is held at the raised position by a stopper (not shown).

Since the front-end portion of the seat member 40 at the half-folded position is spaced apart forward from the backrest 28 held by the backrest holding basket 24c of the second supporting legs 24, the user can place his or her buttocks on this front-end portion and sit down, so that the seat member 40 can be pivoted around the rotational center shafts 42 in the corresponding rotational center grooves or holes 38 of the paired seat member supporting columns 20c of the first supporting legs 20 by his or her weight W to the horizontal position indicated by a solid line in FIGS. 1 and 4 against the urging force of the torsion coil springs 54. In the two layable seats 16 on the right and left sides of FIG. 2, the seat members 40 are also indicated by a solid line at the horizontal positions.

When the user stands up, the seat member 40 is pivoted around the rotational center shafts 42 in the corresponding rotational center grooves or holes 38 of the paired seat member supporting columns 20c of the first supporting legs 20 by the urging force of the torsion coil spring 54 and returns to the half-folded position, which is indicated by the two-dot chain line in FIGS. 4 and 1 and by the solid line in the central layable seat 16 of FIG. 2.

The lower surface of the seat member 40 is covered by a lower surface cover 58. The front-end of the lower surface cover 58 is attached to the front-end portion of the lower surface by hinges so that the lower surface cover 58 is swingable within a predetermined range. When the seat member 40 is set at the horizontal position, the rear-end portion of the lower surface cover 58 is separated downward by its weight from the rear-end portion of the lower surface of the seat member 40 for a predetermined distance. The lower surface cover 58 entirely overlaps the lower surface of the seat member 40 only when the seat member 40 is set at the vertically folded position to entirely overlap the front surface of the backrest 28. This swingable lower surface cover 58 prevents the thin seat member 40 at the horizontal position (i.e., the seating position) from abutting against the lower surface cover 58 thereby preventing the user from taking a rugged seating feel when the user sits on the seat member 40 and it is bent downward.

When the plurality of nestable movable decks 12 are required to be nested such that the decks lower than the highest deck are sequentially nested in the inner space of the highest deck, the layable seats 16 are pivoted to the horizontally laid non-use position where the layable seats 16 are horizontally laid on the upper surface of the corresponding movable deck 12.

In order to pivot the layable seats 16 to the horizontally laid non-use position, if at least one of the first and second supporting legs 20 and 24 is held at the raised position by the stopper (not shown) described above, this stopper (not shown) is released at first, and the first and second supporting legs 20 and 24 at the raised use position are pivoted manually or by a motor to the horizontally laid non-use position so as to be horizontally laid on the upper surface of the corresponding movable deck 12. The horizontally laid non-use position is indicated by a solid line in the right side layable seat 16 of FIG. 1.

During this pivotal movement, the first and second supporting legs 20 and 24 are close to each other by the function of the paired armrests 30 and the paired link levers 44, both of which pair are pivotably coupled to both supporting legs 20 and 24, so that they overlap parallel to each other.

Upon this pivotal movement of the first and second supporting legs 20 and 24, the link levers 44 engage with and push the corresponding engaging pins 46 of the seat member 40 at the half-folded position toward the front ends of the seat member supporting columns 20c of the first supporting legs 20 against the urging force of the torsion coil springs 54. As a result, when the first and second supporting legs 20 and 24 reach the horizontally laid non-use position, the seat member 40 is forcibly set at the vertically folded position to entirely cover the front surface of the backrest 28. The rear-end portion of the lower surface cover 58 contact the upper surface of the corresponding movable deck 12 and is pushed up by this upper surface to entirely overlap the lower surface of the seat member 40.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A layable seat comprising:

supporting leg means which is adapted to be mounted on a floor surface to be pivotable between a raised position where the leg means is raised from the floor surface and a horizontally laid position where the leg means is horizontally laid along the floor surface;

a seat member which is mounted on said supporting leg means to be pivotable between a horizontal position where the seat member extends substantially horizontally from said supporting leg means located at the raised position and a folded position where the seat member is raised substantially vertically to extend along said supporting leg means located at the raised position;

urging means which is mounted on said supporting leg means and urges said seat member to a half-folded position between the horizontal and folded positions; and forcible moving means which is mounted on said supporting leg means and forcibly moves said seat member from the half-folded position to the folded position against an urging force of said urging means in response to the pivotal movement of said supporting leg means from the raised position to the horizontally laid position.

2. A layable seat according to claim 1, wherein said supporting leg means is pivotably mounted on an upper surface of a movable deck having traveling means at its lower end portion.

3. A layable seat according to claim 1, wherein said supporting leg means includes a first supporting leg and a second supporting leg, an extending end of said second supporting leg being located backward from an extending end of said first supporting leg at their raised positions, said seat member has a rotational center shaft at the rear-end portion of said seat member to make said seat member pivotable in a vertical direction, and said forcible moving means includes a link lever which has one end portion coupled to said second supporting leg to be pivotable in the vertical direction and the other end portion of said link lever coupled to said rotational center shaft of the rearend portion of said seat member to be pivotable in the vertical direction, and an engaging pin projecting sideward from a position at the rear-end portion of said seat member located backward from the rotational center shaft of the rear-end portion of said seat member, and said link lever causes said engaging pin of said seat member to move toward the floor surface against the urging force of said urging means while said first and second supporting legs are pivoted from the raised positions to the horizontally laid positions, and sets said seat member at the folded position when said first and second supporting legs reach the horizontally laid positions, so that said seat member is horizontally laid along the floor surface together with said first and second supporting legs at one time.

4. A layable seat according to claim 3, wherein said engaging pin at said rear-end portion of said seat member is engaged with a portion of said first supporting leg when said seat member is located at a horizontal position, so that said seat member is inhibited to move downward from the horizontal position.

5. A layable seat according to claim 3, wherein said urging means includes a torsion coil spring which has a central portion supported by said first supporting leg and two extending end portions clamping said engaging pin at the rear-end portion of said seat member.

6. A layable seat according to claim 3, further comprising a backrest supported by said second supporting leg.

7. A layable seat according to claim 3, wherein a rotational center of said second supporting leg with respect to the floor surface is located backward from and above a rotational center of said first supporting leg with respect to the floor surface, and said layable seat further comprises an armrest which is supported at each of two positions of said armrest, spaced apart from each other in a back-and-forth direction to be vertically pivotable by said first and second supporting legs.

8. A layable seat according to claim 3, wherein said supporting leg means is pivotably mounted on an upper surface of a movable deck having traveling means at the lower-end portion of said movable deck.

*9. A layable seat comprising:*

*a first supporting leg situated on a floor surface and having a first rotational support portion and a distal and portion, the first rotational support portion being supported on the floor surface such that the first rotational support portion is rotatable around a first rotational center shaft, the distal end portion being opposite to the first rotational support portion, said first supporting leg being rotatable between a raised position where said first supporting leg is raised and a horizontally laid position where said first supporting leg is horizontally laid along the floor surface;*

*a seat member, said seat member having a rotational support portion which is located in the front of the rear end of the seat member and which is supported by the first supporting leg to rotate around a rotational center shaft, said seat member being rotatable between a horizontal position where said seat member extends substantially horizontally from said first supporting leg located in the raised position and a folded position where said seat member is substantially vertically raised along said first supporting leg located in the raised position;*

*a second supporting leg situated on the floor surface and in the rear of said first supporting leg, and having a*

*second rotational support portion which is supported on the floor surface such that the second rotational support portion is rotatable around a second rotational center shaft, said second supporting leg being rotatable between a raised position where said second supporting leg is raised and a horizontally laid position where said second supporting leg is horizontally laid along the floor surface, the second rotational support portion being located in the rear of the first rotational support portion of said first supporting leg and in a higher position than the first rotational support portion, the second rotational center shaft being located in a higher position than the first rotational center shaft of said first supporting leg with reference to the floor surface;*

*a backrest supported by said second supporting leg, said backrest extending upwards from the rear end of said seat member when said second supporting leg is located in the raised position thereof, and extending substantially horizontally along the floor surface when said second supporting leg is located in the horizontally laid position thereof;*

*an armrest supported by the distal end portion of said first supporting leg and said second supporting leg such that said armrest is substantially horizontally located, said armrest having a third rotational support portion and a fourth rotational support portion, said third rotational support portion located at the rear end of said armrest and supported by said second supporting leg to rotate around a third rotational center shaft, said fourth rotational support portion located at a middle portion of said armrest, further forward than said third rotational support portion, and supported by the distal end portion of said first supporting leg to rotate around a fourth rotational center shaft, said armrest being rotatable to move said first and second supporting legs to interlock with each other, and the rotational support portion of said seat member being on a line connecting said fourth rotational center shaft and said first rotational center shaft; and*

*urging means, supported by said first supporting leg, for urging said seat member toward a half-folded position between the horizontal position and the folded position.*

*10. A layable seat according to claim 9, further comprising forcible moving means for forcibly moving said seat member from the half-folded position to the folded position when said first supporting leg is rotated from the raised position to the horizontally laid position thereof.*

*11. A layable seat according to claim 9, wherein the floor surface has a base, projected from the floor surface, for supporting said first and second supporting legs such that said first and second supporting legs are rotatable.*

*12. A layable seat according to claim 10 wherein said forcible moving means comprises; a link lever having end portions, one of the end portions rotatably connected to said second supporting leg, the other rotatably connected to said seat member; and an engaging pin provided in the rear end portion of said seat member, the link lever is brought into contact with the engaging pin of said seat member to move the engaging pin against an urging force of said urging means toward the floor surface, when said first and second supporting legs are being rotated from the raised positions to the horizontally laid positions, respectively, so that said seat member is set in the folded position when said first and second supporting legs reach the respective horizontally laid positions.*

*13. A layable seat according to claim 12, wherein when said first and second supporting legs are rotated to the respective raised position and said seat member is rotated to the horizontal position, the engaging pin of said forcible moving means is brought into contact with the link lever of said forcible moving means to prevent said seat member from being rotated downwards from the horizontal position.*

*14. A layable seat comprising:*

*a supporting leg situated on a floor surface and having a first rotational support portion and a distal end portion, the first rotational support portion being supported on the floor surface such that the first rotational support portion is rotatable around a first rotational center shaft, the distal end portion being opposite to the first rotational support portion, said supporting leg being rotatable between a raised position where said supporting leg is raised and a horizontally laid position where said supporting leg is horizontally laid along the floor surface;*

*a seat member, said seat member having a rotational support portion which is located in the front of the rear end of the seat member and which is supported by the supporting leg to rotate around a rotational center shaft, said seat member being rotatable between a horizontal position where said seat member extends substantially horizontally from said supporting leg located in the raised position and a folded position where said seat member is substantially vertically raised along said supporting leg located in the raised position;*

*a backrest situated in the rear of said seat member and having leg member which has a second rotational support portion situated in the rear of said supporting leg such that the second rotational support portion is rotatable around a second rotational center shaft, said backrest being rotatable between a position where said backrest extends upwards from the rear end of said seat member when said supporting leg is located in the raised position and a position where said backrest is laid along the floor surface when said supporting leg is located in the horizontally laid position, the second rotational support portion of said backrest being located in a higher position than the first rotational support portion of said supporting leg with reference to the floor surface;*

*an armrest supported by the distal end portion of said supporting leg and said backrest such that said armrest is substantially horizontally located, said armrest having a third rotational support portion and a fourth rotational support portion, said third rotational support portion located at the rear end of said armrest and supported by said leg member to rotate around a third rotational center shaft, said fourth rotational support portion located at a middle portion of said armrest, further forward than said third rotational support portion, and supported by the distal end portion of said supporting leg to rotate around a fourth rotational center shaft, said armrest being rotatable to move said leg member and said supporting leg to interlock with each other, and the rotational support portion of said seat member being on a line connecting said fourth rotational center shaft and said first rotational center shaft; and*

*urging means, supported by said supporting leg, for urging said seat member toward a half-folded position between the horizontal position and the folded position.*

*15. A layable seat according to claim 14, further comprising forcible moving means for forcibly moving said seat*

*member from the half-folded position to the folded position when said supporting leg is rotated from the raised position to the horizontally laid position.*

*16. A layable seat comprising:*

*a first supporting leg situated on a floor surface and having a first rotational support portion and a distal end portion, the first rotational support portion being supported on the floor surface such that the first rotational support portion is rotatable around a first rotational center shaft, the distal end portion being opposite to the first rotational support portion, said first supporting leg being rotatable between a raised position where said first supporting leg is raised and a horizontally laid position where said first supporting leg is horizontally laid along the floor surface;*

*a seat member, said seat member having a rotational support portion which is located in the front of the rear end of the seat member and which is supported by the first supporting leg to rotate around a rotational center shaft, said seat member being rotatable between a horizontal position where said seat member extends substantially horizontally from said first supporting leg located in the raised position and a folded position where said seat member is substantially vertically raised along said first supporting leg located in the raised position;*

*a second supporting leg situated on the floor surface and in the rear of said first supporting leg, and having a second rotational support portion which is supported on the floor surface such that the second rotational support portion is rotatable around a second rotational center shaft, said second supporting leg being rotatable between a raised position where said second supporting leg is raised and a horizontally laid position where said second supporting leg is horizontally laid along the floor surface, the second rotational support portion being located in the rear of the first rotational support portion of said first supporting leg and in a higher position than the first rotational support portion, the second rotational center shaft being located in a higher position than the first rotational center shaft of said first supporting leg with reference to the floor surface;*

*a backrest supported by said second supporting leg, said backrest extending upwards from the rear end of said seat member when said second supporting leg is located in the raised position thereof, and extending substantially horizontally along the floor surface when said second supporting leg is located in the horizontally laid position thereof;*

*an armrest supported by the distal end portion of said first supporting leg and said second supporting leg such that said armrest is substantially horizontally located, said armrest having a third rotational support portion and a fourth rotational support portion, said third rotational support portion located at the rear end of said armrest and supported by said second supporting leg to rotate around a third rotational center shaft, said fourth rotational support portion located at a middle portion of said armrest, further forward than said third rotational support portion, and supported by the distal end portion of said first supporting leg to rotate around a fourth rotational center shaft, said armrest being rotatable to move said first and second supporting legs in interlock with each other, and the rotational support portion of said seat member being on a line connecting said fourth rotational center shaft and said first rotational center shaft.*

*17. A seating system comprising decks which are arranged in a stepwise manner and have top plates such that the top plates are located at different levels with reference to a floor surface, and seats which are arranged on upper surfaces of the top plates a first decks, each of said seats comprising:*

*a first supporting leg situated on the upper surface of the top plate of an associated one of said decks and having a first rotational support portion and a distal end portion, the first rotational support portion being supported on the upper surface of the top plate such that the first rotational support portion is rotatable around a first rotational center shaft, the distal end portion being opposite to the first rotational support portion, said first supporting leg being rotatable between a raised position where said first supporting leg is raised and a horizontally laid position where said first supporting leg is horizontally laid along the upper surface of the top plate;*

*a seat member, said seat member having a rotational support portion which is located in the front of the rear end of the seat member and which is supported by the first supporting leg to rotate around a rotational center shaft, said seat member being rotatable between a horizontal position where said seat member extends substantially horizontally from said first supporting leg located in the raised position and a folded position where said seat member is substantially vertically raised along said first supporting leg located in the raised position;*

*a second supporting leg situated on the upper surface of the top plate of said associated one of said decks and in the rear of said first supporting leg, and having a second rotational support portion which is supported on the upper surface of the top plate such that the second rotational support portion is rotatable around a second rotational center shaft, said second supporting leg being rotatable between a raised position where said second supporting leg is raised and a horizontally laid position where said second supporting leg is horizontally laid along the upper surface of the top plate, the second rotational support portion being located in the rear of the first rotational support portion of said first supporting leg and in a higher position than the first rotational support portion, the second rotational center shaft being located in a higher position than the first rotational center shaft of said first supporting leg with reference to the upper surface of the top plate of said associated one of said deck;*

*a backrest supported by said second supporting leg, said backrest extending upwards from the rear end of said seat member when said second supporting leg is located in the raised position thereof, and extending substantially horizontally along the upper surface of the top plate of said associated one of said decks when said second supporting leg is located in the horizontally laid position thereof;*

*an armrest supported by the distal end portion of said first supporting leg and said second supporting leg such that said armrest is substantially horizontally located, said armrest having a third rotational support portion and a fourth rotational support portion, said third rotational support portion located at the rear end of said armrest and supported by said second supporting leg to rotate around a third rotational center shaft, said fourth rotational support portion located at a middle*

*portion of said armrest, further forward than said third rotational support portion, and supported by the distal end portion of said first supporting leg to rotate around a fourth rotational center shaft, and the rotational support portion of said seat member being on a line connecting said fourth rotational center shaft and said first rotational center shaft; and*

*urging means, supported by said first supporting leg, for urging said seat member toward a half-folded position between the horizontal position and the folded position.*

*18. A seating system according to claim 17, wherein each of the top plates of said decks has a base, projected from the upper surface of said each of the top plates, for supporting said first and second supporting legs such that said first and second supporting legs are rotatable.*

*19. A seating system according to claim 17, wherein said decks are movable between a use position where said decks are arranged in a stepwise manner and a store position where in said decks are stacked such that space is provided between the top plates of any two adjacent ones of the said decks, and each of said seats is stored in the space between the associated two top plates when said decks are moved to the store position.*

*20. A system according to claim 19, wherein each of said decks has wheels which are in contact with the floor surface such that the wheels are rotatable to move said each of said decks.*

*21. A seating system according to claim 17, further comprising forcible moving means for forcibly moving said sell member from the half-folded position to the folded position when said first supporting leg is rotated from the raised position to the horizontally laid position thereof.*

*22. A seating system according to claim 21, wherein said forcible moving means comprises: a link lever which has end portions, one of the end portions rotatably connected to said second supporting leg, the other rotatably connected to said seat member; and an engaging pin which is provided in the rear end portion of said seat member, the link lever being brought into contact with the engaging pin of said seat member to move the engaging pin against an urging force of said urging means toward the upper surface of the top plate, when said first and second supporting legs are being rotated from the raised positions to the horizontally laid positions, respectively, so that said seat member is set in the folded position when said first and second supporting legs reach the respective horizontally laid positions.*

*23. A seating system according to claim 22, wherein when said first and second supporting legs are rotated to the respective raised position and said seat member is rotated to the horizontal position, the engaging pin of said forcible moving means is brought into contact with the link lever of said forcible moving means to prevent said seat member from being rotated downwards from the horizontal position.*

*24. A seating system comprising decks which are arranged in a stepwise manner and have top plates such that the top plates are located at different levels with reference to a floor surface, and seats which are arranged on upper surfaces of the top plates of said decks, each of said seats comprising:*

*a supporting leg situated on the upper surface of the top plate of an associated one of said decks and having a first rotational support portion and a distal end portion, the first rotational support portion being supported on the upper surface of the top plate such that the first rotational support portion is rotatable around a first rotational center shaft, the distal end portion being opposite to the first rotational support portion, said supporting leg being rotatable between a raised position where said supporting leg is raised and a horizontally laid position where said supporting leg is horizontally laid along the upper surface of the top plate;*

*a seat member, said seat member having a rotational support portion which is located in the front of the rear end of the seat member and which is supported by the supporting leg to rotate around a rotational center shaft, said seat member being rotatable between a horizontal position where said seat member extends substantially horizontally from said supporting leg located in the raised position and a folded position where said seat member is substantially vertically raised along said supporting leg located in the raised position;*

*a backrest located in the rear of said seat member, and having a leg member having a second rotational support portion which is located in the rear of said supporting leg and supported on the upper surface of the top plate of said associated one of said decks such that the second rotational support portion is rotatable around a second rotational center shaft, said backrest extending towards from the rear end of said seat member when said supporting leg is located in the raised position, and extending substantially horizontally along the upper surface of the top plate when said supporting leg is located in the horizontally laid position, the second rotational support portion being located in a higher position than the first rotational support portion of said supporting leg with reference to the upper surface of the top plate of said associated one of said decks;*

*an armrest supported by the distal end portion of said supporting leg and said backrest such that said armrest is substantially horizontally located, said armrest having a third rotational support portion and a fourth rotational support portion, said third rotational support portion located at the rear end of said armrest and supported by said leg member to rotate around a third rotational center shaft, said fourth rotational support portion located at a middle portion of said armrest, further forward than said third rotational support portion, and supported by the distal end portion of said supporting leg to rotate around a fourth rotational center shaft, said armrest being rotatable to move said leg member and said supporting leg to interlock with each other, and the rotational support portion of said seat member being on a line connecting said fourth rotational center shaft and said first rotational center shaft; and*

*urging means, supported by said supporting leg, for urging said seat member toward a half-folded position between the horizontal position and the folded position.*

*25. A seating system according to claim 24, further comprising forcible moving means for forcibly moving said seat member from the half-folded position to the folded position when said supporting leg is rotated from the raised position to the horizontally laid position.*

*26. A seating system according to claim 24, wherein said decks are movable between a use position where said decks are arranged in a stepwise manner and a store position where said decks are stacked such that space is provided between the top plates of any two adjacent ones of said decks, and each of said seats is stored in the space between the associated two top plates when said decks are moved to the store position.*

* * * * *